US011970210B2

(12) United States Patent
Galazin et al.

(10) Patent No.: US 11,970,210 B2
(45) Date of Patent: Apr. 30, 2024

(54) SUSPENSION ASSEMBLY WITH SLIDER ARRANGEMENT

(71) Applicant: SAF-Holland, Inc., Muskegon, MI (US)

(72) Inventors: Gregory Thomas Galazin, Muskegon, MI (US); Edward Robert Hammer, Casnovia, MI (US); Jeffrey M. Galla, Norton Shores, MI (US)

(73) Assignee: SAF-Holland, Inc., Muskegon, MI (US)

( * ) Notice: Subject to any disclaimer, the term of this patent is extended or adjusted under 35 U.S.C. 154(b) by 0 days.

(21) Appl. No.: 17/814,633

(22) Filed: Jul. 25, 2022

(65) Prior Publication Data

US 2023/0034135 A1    Feb. 2, 2023

Related U.S. Application Data

(60) Provisional application No. 63/226,520, filed on Jul. 28, 2021.

(51) Int. Cl.
*B60G 11/04*    (2006.01)
*B60G 5/047*    (2006.01)
(Continued)

(52) U.S. Cl.
CPC .............. *B62D 21/11* (2013.01); *B60G 11/34* (2013.01); *B60G 21/05* (2013.01); *B62D 21/03* (2013.01);
(Continued)

(58) Field of Classification Search
CPC .. B60G 11/34; B60G 21/05; B60G 2202/112; B60G 2300/026; B62D 21/02;
(Continued)

(56) References Cited

U.S. PATENT DOCUMENTS 7,600,785 B2 * 10/2009 Ramsey ................. B60G 11/27
280/781
7,658,412 B2 * 2/2010 Ramsey ................. B60G 7/02
280/784

(Continued)

FOREIGN PATENT DOCUMENTS

CN    106741246 A  *  5/2017
FR     3105100 A1  *  6/2021  ............ B60G 11/04

*Primary Examiner* — Jason D Shanske
*Assistant Examiner* — Daniel M. Keck
(74) *Attorney, Agent, or Firm* — Price Heneveld LLP

(57) ABSTRACT

A vehicle suspension arrangement includes a suspension slider assembly including first and second laterally spaced longitudinal frame members configured to be slidably coupled to a first vehicle frame member, first and second gusset members fixed to the first and second longitudinal frame members and each including a relief, a first lateral frame member extending between the first and second longitudinal frame members, the first lateral frame member having ends received within the reliefs, an axle member configured to support a pair of wheel assemblies, and a suspension assembly configured to support the suspension slider assembly from the axle member, the suspension assembly including a spring member positioned between the suspension slider assembly and the axle member.

21 Claims, 20 Drawing Sheets

(51) Int. Cl.
  *B60G 11/107* (2006.01)
  *B60G 11/34* (2006.01)
  *B60G 21/05* (2006.01)
  *B62D 21/03* (2006.01)
  *B62D 21/11* (2006.01)
  *B62D 53/06* (2006.01)

(52) U.S. Cl.
  CPC .. *B60G 2202/112* (2013.01); *B60G 2300/026* (2013.01)

(58) Field of Classification Search
  CPC ........ B62D 21/03; B62D 21/05; B62D 21/11; B62D 53/06; B62D 53/068
  See application file for complete search history.

(56) References Cited

U.S. PATENT DOCUMENTS

| | | | |
|---|---|---|---|
| 10,370,033 B1* | 8/2019 | Klein | B62D 21/20 |
| 2005/0218646 A1* | 10/2005 | Ramsey | B62D 21/02 |
| | | | 280/788 |
| 2009/0243244 A1 | 10/2009 | Richardson et al. | |
| 2009/0243247 A1 | 10/2009 | Richardson et al. | |
| 2017/0334262 A1* | 11/2017 | Durham | B60G 17/023 |
| 2018/0334004 A1* | 11/2018 | Andreasen | B60G 9/003 |

\* cited by examiner

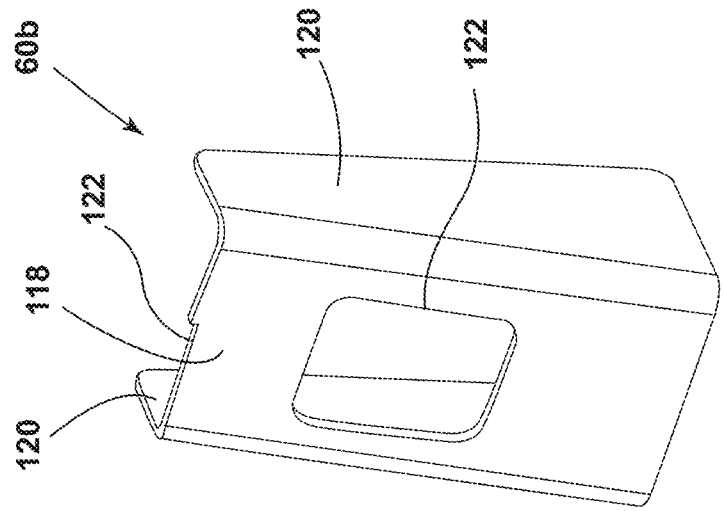
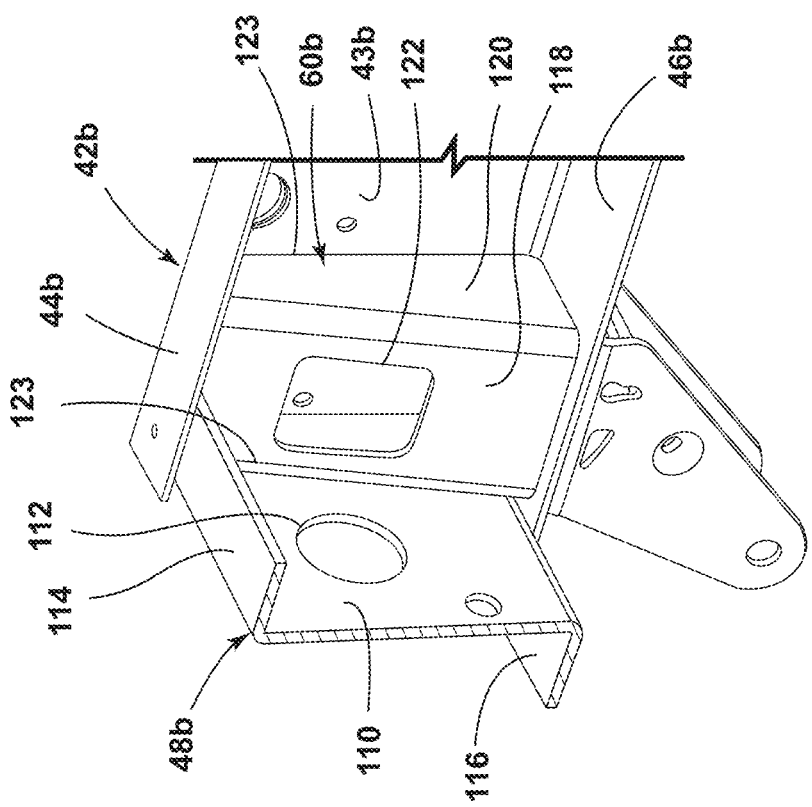
FIG. 13
FIG. 14

SUSPENSION ASSEMBLY WITH SLIDER ARRANGEMENT

CROSS-REFERENCE TO RELATED APPLICATIONS

This application claims the benefit of U.S. Provisional Patent Application No. 63/226,520, filed on Jul. 28, 2021, entitled "SUSPENSION ASSEMBLY WITH SLIDER ARRANGEMENT," the entire disclosure of which is incorporated herein by reference.

BACKGROUND OF THE INVENTION

The embodiments as shown and described herein relate to a vehicle suspension arrangement, particularly for heavy duty vehicles, and specifically a vehicle suspension arrangement that allows sliding repositioning of a supporting suspension assembly with respect to an associated vehicle frame assembly.

SUMMARY OF THE INVENTION

One embodiment as disclosed herein may include a vehicle suspension arrangement that includes a suspension slider assembly including a first longitudinal frame member configured to be slidably coupled to a first vehicle frame member, a second longitudinal frame member laterally spaced from the first longitudinal frame member and configured to be slidably coupled to a first vehicle frame member, a first gusset member fixed to the first longitudinal frame member and including a first relief, a second gusset member fixed to the second longitudinal frame member and including a second relief, and a first lateral frame member extending between the first and second longitudinal frame members, the first lateral frame member having a first end received within the first relief and a second end received within the second relief, an axle member configured to support a pair of wheel assemblies, and a suspension assembly configured to support the suspension slider assembly from the axle member, the suspension assembly including a spring member positioned between the suspension slider assembly and the axle member.

Another embodiment as disclosed herein may further or alternatively include a vehicle suspension arrangement that includes a suspension slider assembly configured to be slidably coupled to a vehicle frame assembly, an axle member configured to support a pair of wheel assemblies, and a suspension assembly configured to support the suspension slider assembly from the axle member, the suspension assembly including at least one leaf spring having a first end and a second end, a first hanger bracket pivotably coupling the first end of the at least one leaf spring to the suspension slider assembly, wherein the first hanger bracket is coupled to the suspension slider assembly via a first mechanical fastener, a second hanger bracket pivotably coupling the second end of the leaf spring to the suspension slider assembly, wherein the second hanger bracket is coupled to the suspension slider assembly via a second mechanical fastener, and a trailing arm having a first end pivotably coupled to the first hanger bracket, and a second end operably coupled to the axle member.

Yet another embodiment as disclosed herein may further or alternatively include a vehicle suspension arrangement that includes a suspension slider assembly configured to be slidably coupled to a vehicle frame assembly, an axle member configured to support a pair of wheel assemblies, and a suspension assembly configured to support the suspension slider assembly from the axle member, the suspension assembly including a first leaf spring having a first end and a second end, a second leaf spring having a first end and a second end, a first hanger bracket operably coupled to the suspension slider assembly and pivotably coupling the first end of the first leaf spring to the suspension slider assembly, a second hanger bracket operably coupled to the suspension slider assembly and pivotably coupling the first end of the second leaf spring to the suspension slider assembly, and a center hanger bracket assembly that includes a third hanger bracket operably coupled to the suspension slider assembly, and an equalizing bracket pivotably coupled to the third hanger bracket and fixedly coupled to the second end of the first leaf spring and the second end of the second leaf spring.

These and other features, advantages, and objects of the present invention will be further understood and appreciated by those skilled in the art by reference to the following specification, claims, and appended drawings.

BRIEF DESCRIPTION OF THE DRAWINGS

FIG. 12A is an enlarged perspective view of the area XIIA, FIG. 12;

FIG. 13 is a partial perspective view of the suspension slider assembly of FIG. 11;

FIG. 14 is a perspective view of a gusset of the suspension slider assembly of FIG. 11;

DETAILED DESCRIPTION OF THE PREFERRED EMBODIMENTS

Figure 1:
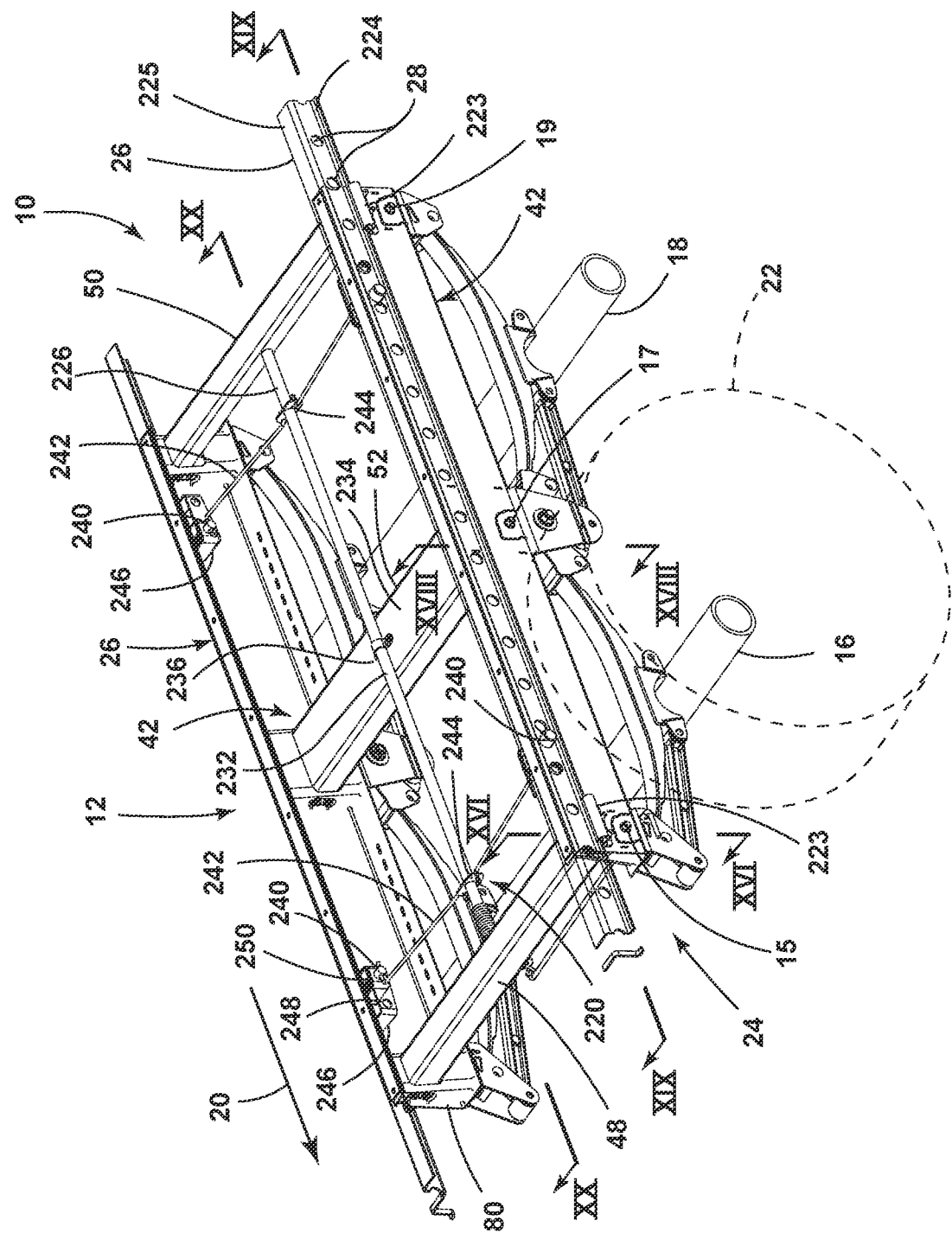
FIG. 1 is a perspective view of a vehicle suspension arrangement.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

As best illustrated in FIG. 1, a vehicle suspension arrangement 10 slidably engages a vehicle frame assembly 12 to support an associated overall vehicle assembly at various preselected positions along a length of the vehicle frame assembly 12. In the illustrated example, the vehicle suspension arrangement 10 includes a suspension slider assembly 14 that slidably engages the vehicle frame assembly 12, a pair of axle members including a front axle member 16 and a rear axle member 18, where the overall vehicle assembly travels in a direction 20 and the axle members 16, 18 support wheel assemblies 22, and a suspension assembly 24 operably supporting the suspension slider assembly 14 from the axle members 16, 18.

The vehicle frame assembly 12 may include a pair of longitudinally-extending vehicle frame rails 26 each having a Z-shaped cross-sectional configuration and a plurality of locking apertures 28 spaced along the length thereof.

Figure 2:
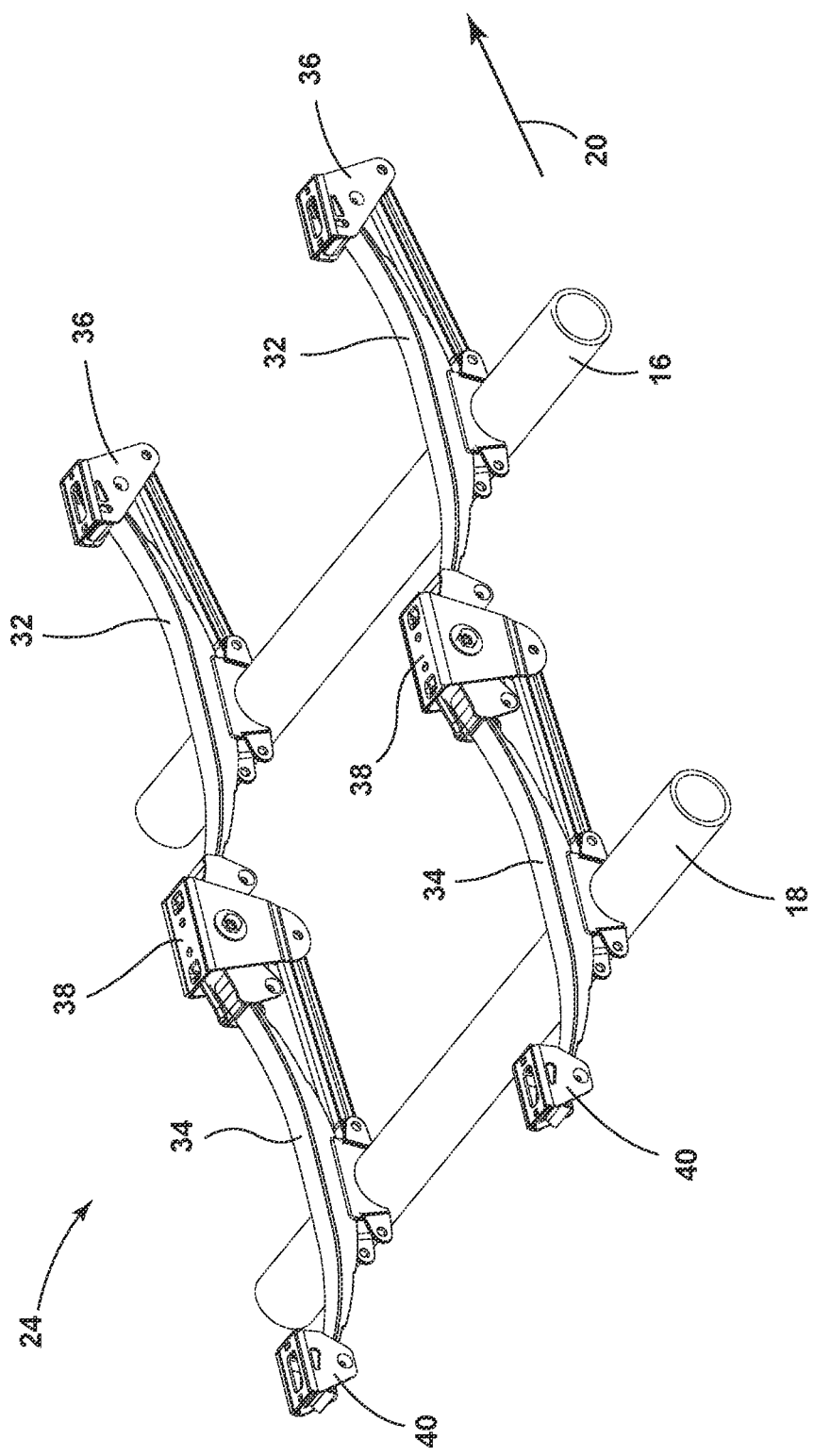
FIG. 2 is a perspective view of a suspension assembly.

The suspension assembly 24 (FIG. 2) may include a plurality of leaf spring assemblies including a pair of front leaf spring assemblies 32 and a pair of rear leaf spring assemblies 34. In the illustrated example, the front leaf spring assemblies 32 are operably coupled to the suspension slider assembly 14 via respective front hanger brackets 36 and center hanger bracket assemblies 38, while the rear leaf spring assemblies 34 are operably coupled to the suspension slider assembly 14 via respective rear hanger brackets 40 and the center hanger bracket assemblies 38, as further described below. Although, the present example of the suspension assembly 24 described herein includes leaf spring assemblies 32, 34, other spring elements may also be utilized including, but not limited to, air spring assemblies depending on the overall application.

Figure 6:
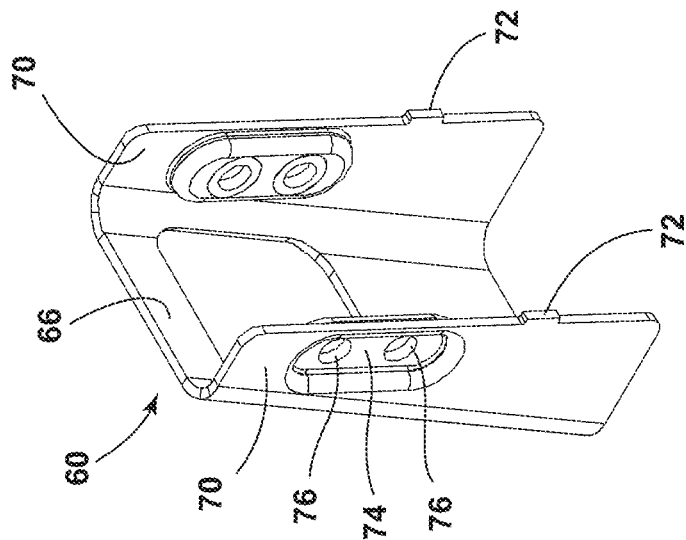
FIG. 6 is a perspective view of the gusset.

In one embodiment, the suspension slider assembly 14 (FIGS. 3 and 4) may include a pair of laterally spaced longitudinal frame members 42 each having a vertically-extending body portion 43, an upper flange 44 extending orthogonally inward from the body portion 43, and a lower flange 46 extending substantially orthogonally inward from the body portion 43, where the hanger brackets 36, 38, 40 are secured to the lower flange 46 of the associated longitudinal frame member 42 via respective pluralities of bolts 15, 17, 19 (FIG. 1). The suspension slider assembly 14 may further include a plurality of box-shaped lateral frame members, including a front lateral frame member 48, a rear lateral frame member 50 and a center lateral frame member 52, where the lateral frame members 48, 50, 52 are longitudinally spaced from one another along the length of the longitudinal frame members 42. In the illustrated example, each of the lateral frame members 48, 50, 52 have a box-shaped cross-sectional configuration, where the front lateral frame member 48 has a downwardly and rearwardly opening, longitudinally-extending slot 54, the rear lateral frame member 50 includes a downwardly and forwardly opening, longitudinally-extending slot 56, and the center lateral frame member 52 includes a downwardly, longitudinally-extending slot 58. The lateral frame members 48, 50, 52 may be provided with alternative cross-sectional configurations, as further described below. The suspension slider assembly 40 further includes a plurality of gusset members configured to attach the lateral frame members 48, 50, 52 to the longitudinal frame members 42, including a pair of front gusset members 60, a pair of rear gusset members 62 similarly configured as the front gusset members 60, and a pair of center gusset members 64. By way of example, one of the front gusset members 60 is described below, and it is noted that the front gusset members 60 and the rear gusset members 62 are similarly constructed. In the illustrated example, each front gusset members 60 (FIGS. 5 and 6) includes a body portion 66 having an aperture 68 extending therethrough, and a pair of side walls 70 each extending orthogonally outward from the body portion 66. Each side wall 70 may include an alignment tab 72 located along the vertical length thereof, and a recessed area 74 that includes a pair of apertures 76 configured to receive mechanical fasteners therethrough for fastening the front gusset member 60 to the front lateral frame member 48, as described below. An alternatively-configured gusset 60a (FIG. 5A) may include an over-bent or recessed sidewalls 70a rather than a recessed area 74 as described above with respect to the gusset 60. Since the gusset 60a is similar to the gusset 60, similar parts or elements appearing in FIG. 5 and FIG. 5A respectively are represented by the same, corresponding reference numeral, except for the suffix "a" in the numerals of the latter. During assembly, the alignment tabs 72 are positioned within corresponding alignment slots 78 extending through the body portion 43 of the associated longitudinal frame member 42, thereby assuring proper alignment of the front gusset member 60 with the longitudinal frame member 42. A weld 80 (FIG. 1) is then placed about the periphery of the front gusset member 60, thereby fixedly securing the front gusset member 60 with the longitudinal frame member 42. The rear gusset members 62 and the center gusset members 64 include similar alignment features, such as tabs similar to those as discussed above with respect to the front gusset member 60 and that cooperate with corresponding and appropriately located slots within the longitudinal frame member 42, where each gusset member 62, 64 is weldably secured to the associated longitudinal frame member 42 during assembly.

Figure 3:
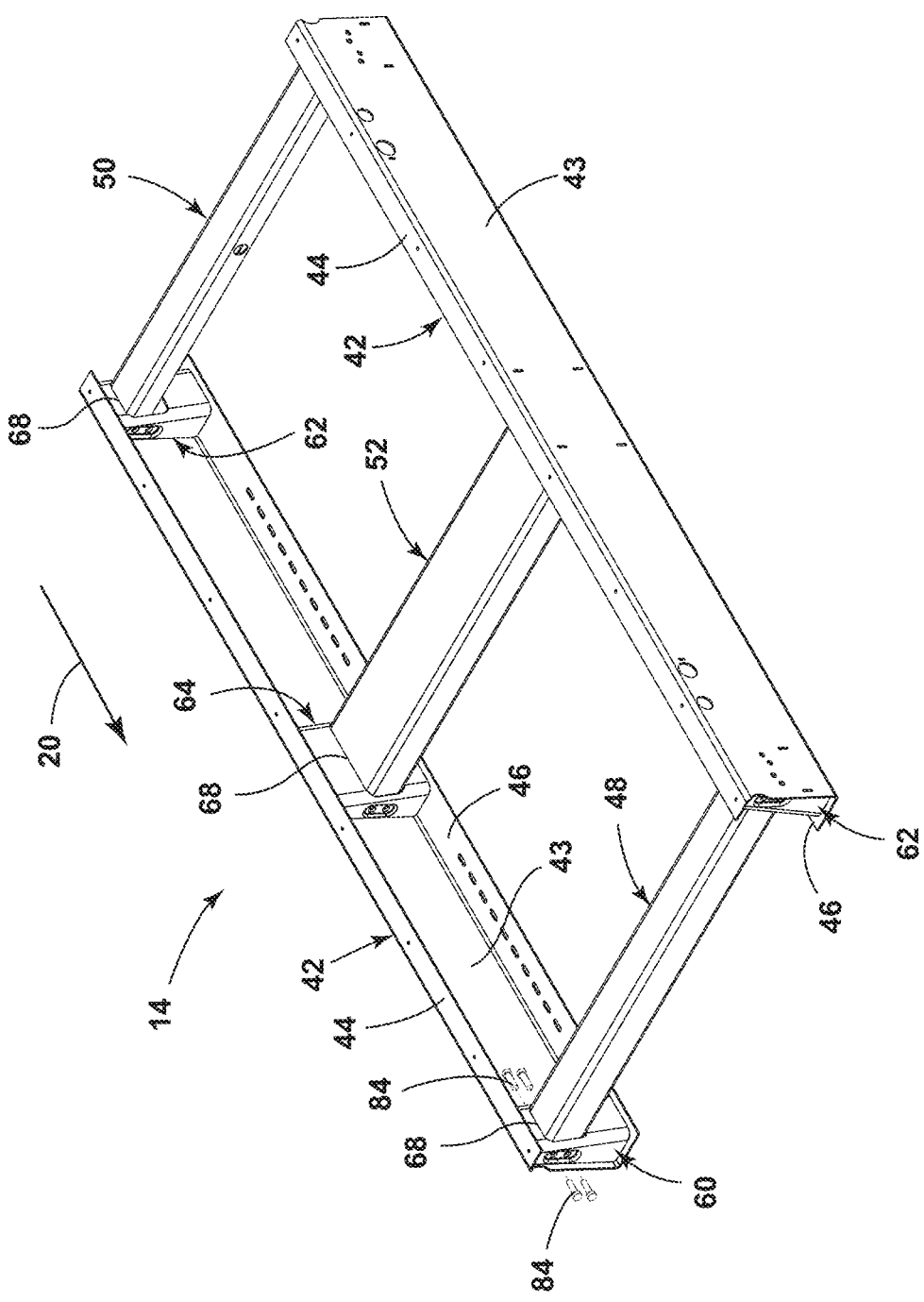
FIG. 3 is a perspective view of a suspension slider assembly.
Figure 4:
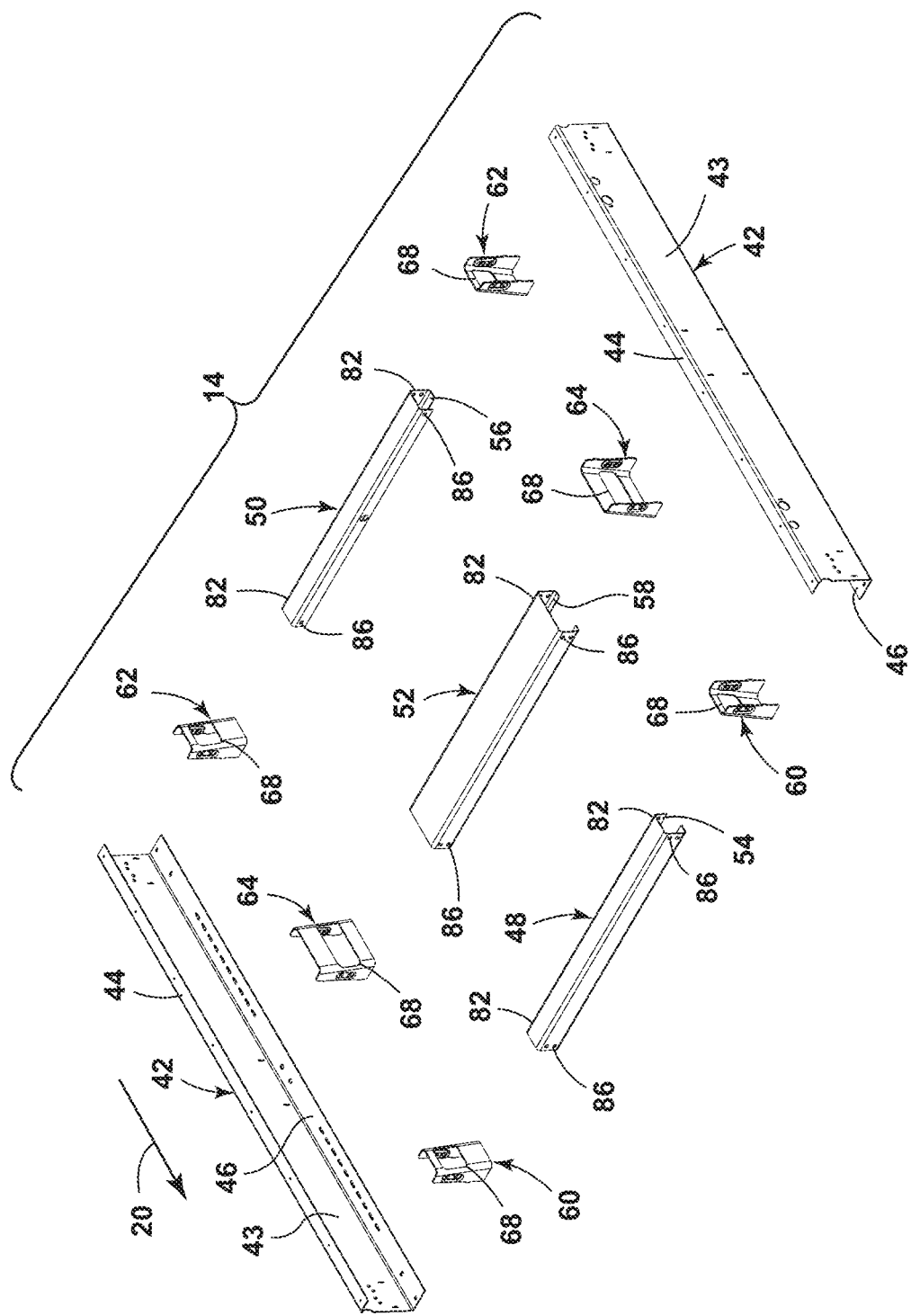
FIG. 4 is an exploded perspective view of the suspension slider assembly.
Figure 5:
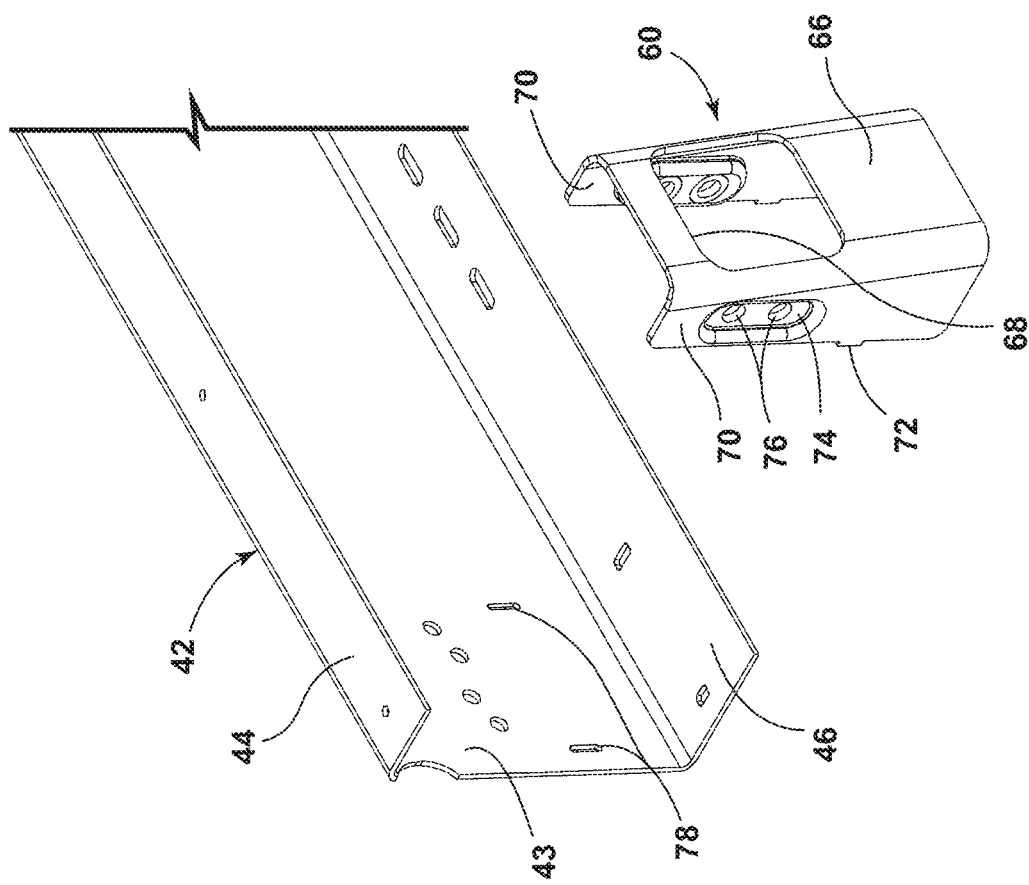
FIG. 5 is an exploded perspective view of a vehicle frame rail and a gusset.
Figure 5A:
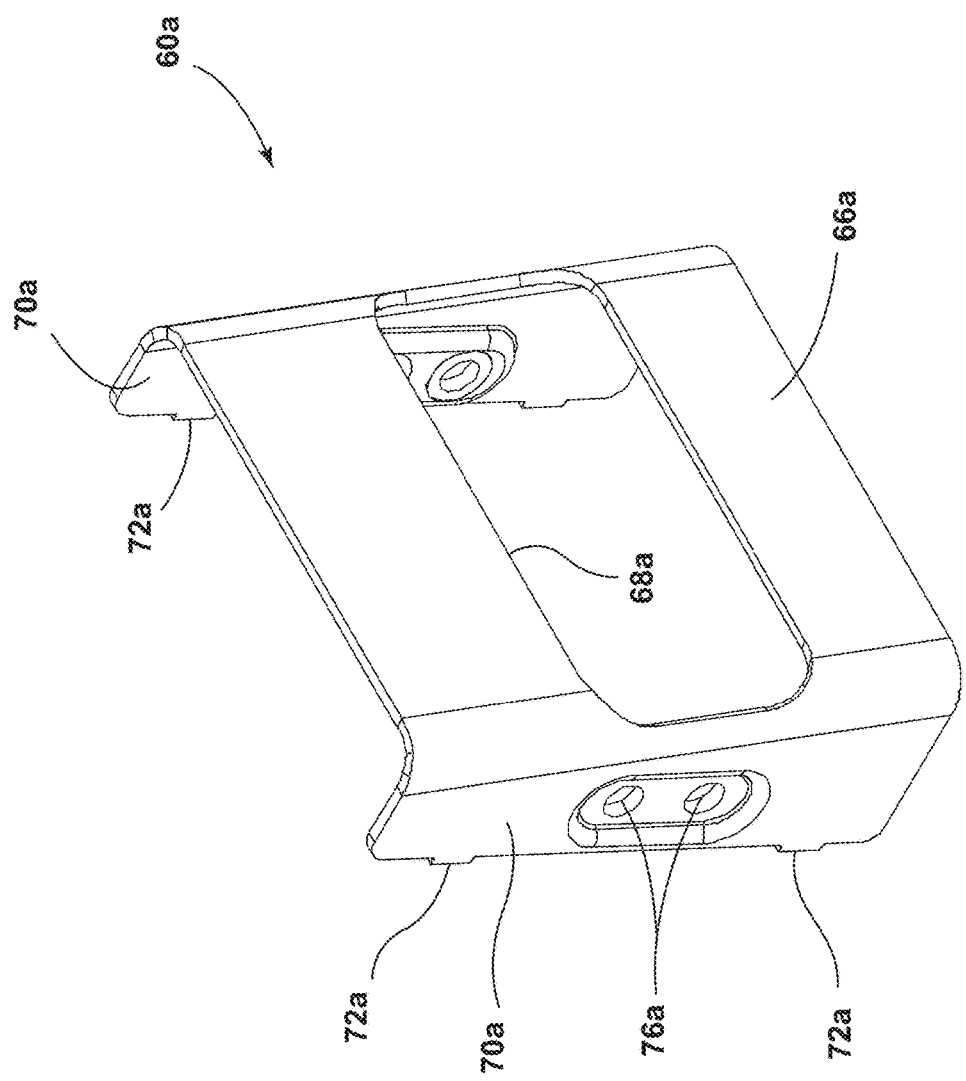
FIG. 5A is a perspective view of an alternative embodiment of the gusset.

As best illustrated in FIGS. 3 and 4, the ends 82 of the lateral frame members 48, 50, 52 are inserted into the aperture 68 of the gusset members 60, 62, 64 and are secured thereto via a plurality of mechanical fasteners, such as bolts 84 that extend through the apertures 76 (FIGS. 5 and 6) and through corresponding apertures 86, 68 located at the ends 82 of the lateral frame members 48, 50, 52 and are held in place by corresponding nuts (not shown). It is noted that the non-welded, modular construction of the suspension slider assembly 14 provided via the mechanical fastening arrangements allow portions of the suspension slider arrangement 14 to be prefabricated, and the final assembly to be done on-site or at a facility where an associated trailer assembly is being constructed, and allows the installer/manufacturer, to easily adjust the overall width of the suspension slider assembly 14 to fit vehicles having various spacing between the longitudinal frame members 42. It is noted that other mechanical fasteners configured to provide such advantages may also or alternatively be utilized.

Figure 8:
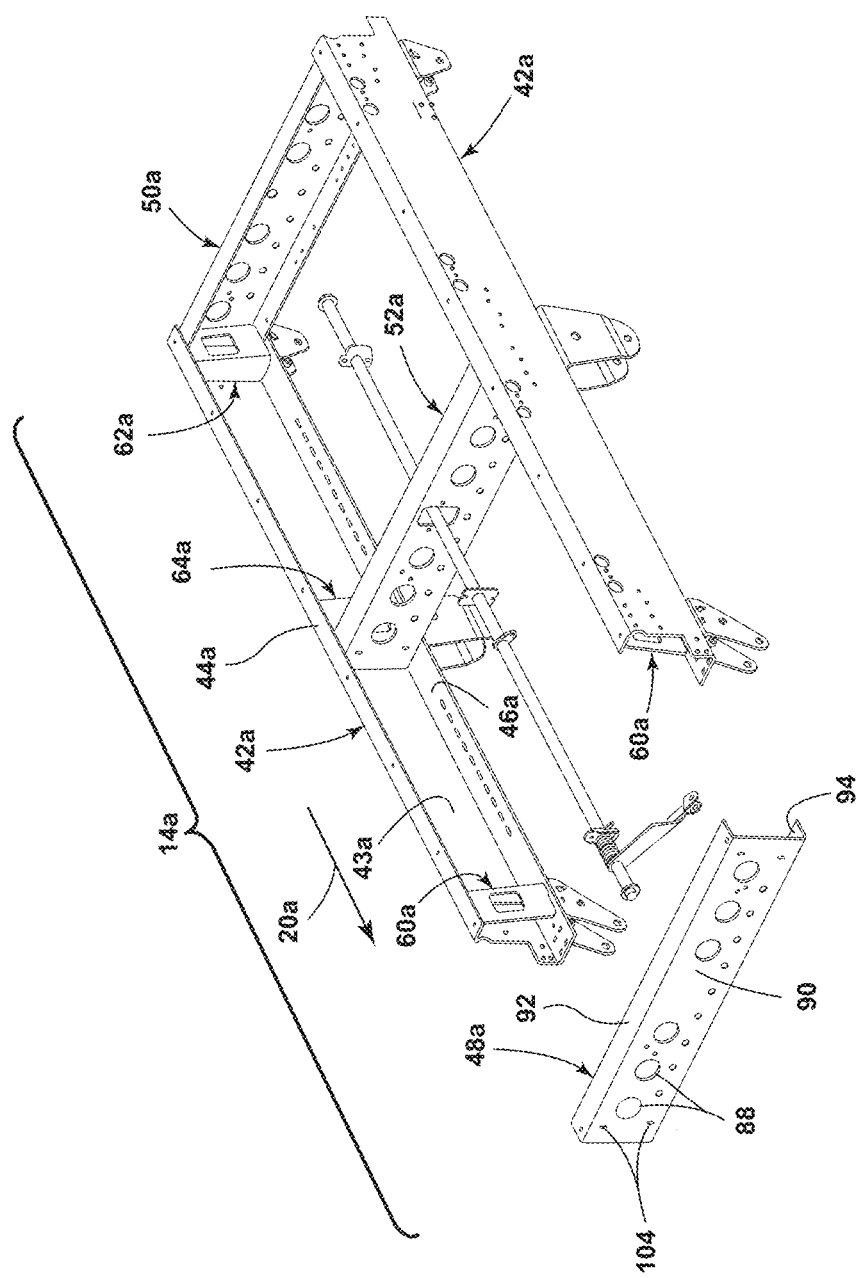
FIG. 8 is an exploded perspective view of the alternative embodiment of the suspension slider assembly.
Figure 10:
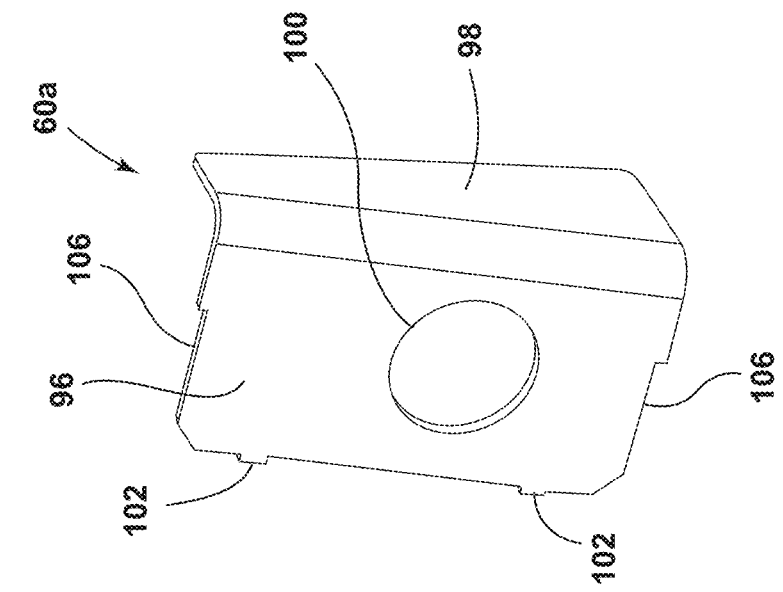
FIG. 10 is a perspective view of a gusset of the suspension slider assembly of FIG. 7.
Figure 9:
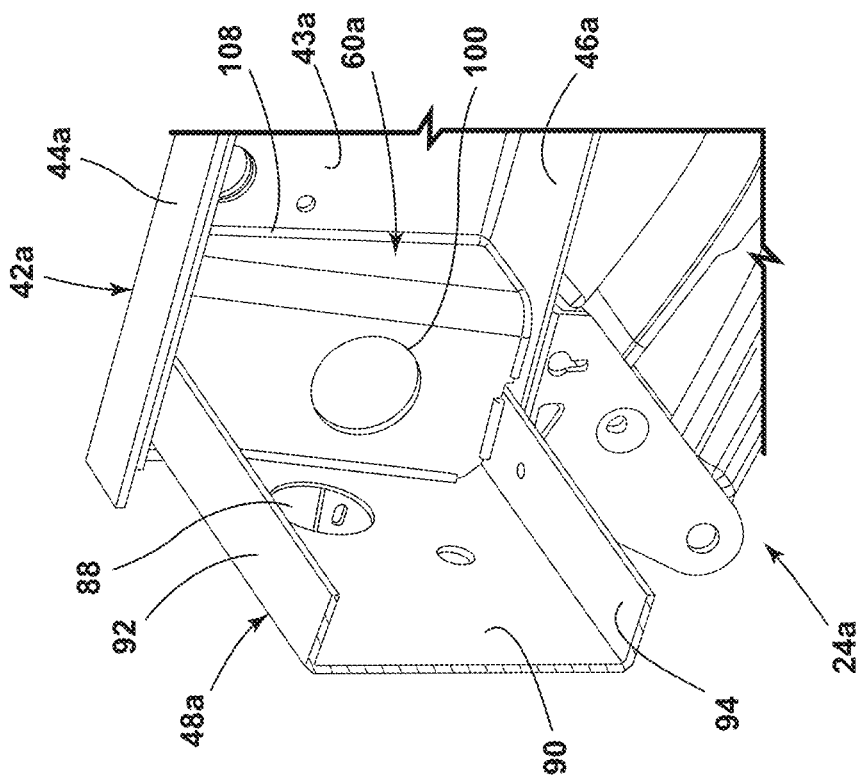
FIG. 9 is a partial perspective view of the alternative embodiment of the suspension slider assembly.

The reference numeral 14a (FIGS. 7 and 8) generally designates another embodiment of the suspension slider assembly. Since the suspension slider assembly 14a is similar to the previously described suspension slider assembly 14, similar parts appearing in FIGS. 1-6 and FIGS. 7 and 8 respectively are represented by the same, corresponding reference numeral, except for the suffix "a" in the numerals of the latter. In the illustrated example, the front lateral frame member 48a, the rearward lateral frame member 50a and the center lateral frame member 52a are each provided with a C-shaped cross-sectional configuration, with a plurality of weight-reducing apertures 88 that may be spaced along the length thereof. Each lateral frame member 48a, 50a, 52a includes a body portion 90, and an upper flange 92 and a lower flange 94 each extending orthogonally from the body portion 90. The suspension slider assembly 14a may further include a pair of front gusset members 60a, a pair of rear gusset members 62a and a pair of center gusset members 64a. As the gusset members 60a, 62a, 64a may be similarly configured, by way of example each rear gusset member 62a (FIGS. 9 and 10) includes a body portion 96, and a side wall 98 extending orthogonally from the body portion 96. The body portion 96 may include a weight-reducing aperture 100 extending therethrough. The body portion 96 may further include a pair of alignment tabs 102 while the front lateral frame member 50a may include a pair of corresponding alignment slots 104 that cooperate to assist with proper alignment of the front lateral frame member 48a with the corresponding longitudinal frame member 42a during assembly. The body portion 96 may further include cutouts 106 that provide spacing for the upper and lower flanges 92, 94 of the front lateral frame member 48a between the front gusset member 60a and the upper and lower flanges 44a, 46a of the associated longitudinal frame member 42a. As best illustrated in FIG. 9, a weld 108 may be placed about the periphery of the front gusset member 68 subsequent to proper alignment of the front lateral frame member 48a with the front gusset member 60a and the longitudinal frame member 42a, thereby fixedly securing the front lateral frame member 48a with the longitudinal frame member 42a.

The reference numeral 14b (FIGS. 11 and 12) generally designates another embodiment of the suspension slider assembly. Since the suspension slider assembly 14b is similar to the previously described suspension slider assembly 14, similar parts appearing in FIGS. 1-6 and FIGS. 11 and 12 respectively are represented by the same, corresponding reference numeral, except for the suffix "b" in the numerals of the latter. In the illustrated example, the suspension slider assembly 14b includes a front lateral frame member 48b, a rear lateral frame member 50b and a center lateral frame member 52b, each having a Z-shaped cross-sectional configuration. As each of the lateral frame members 48b, 50b, 52b are similarly-configured, the rear lateral frame member 50b is described herein. In the illustrated example, each rear lateral frame member 50b includes a body portion 110 with a plurality of weight-reducing apertures 112 that may be spaced along the length thereof, an upper flange 114 extending orthogonally from the body portion 110, and a lower flange 116 extending orthogonally from the body portion 110 and opposite the upper flange 114. It is noted that the rearwardly-extending lower flange 116 (FIGS. 12 and 12A) may be utilized to support accessories and other components from the suspension slider assembly 14a, such as mud flaps, aerodynamic improvement components, and the like.

Figure 11:
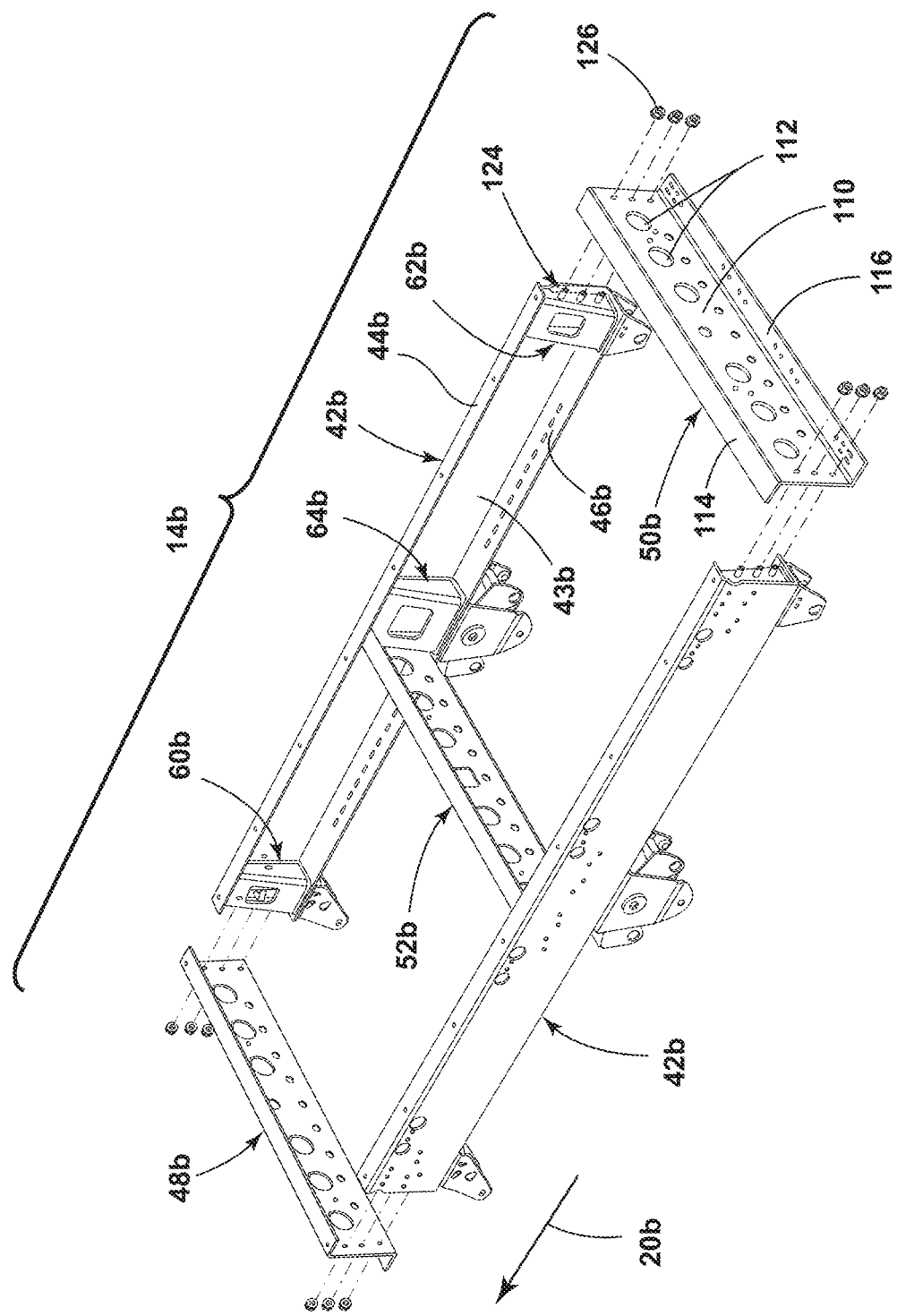
FIG. 11 is an exploded perspective view of another alternative embodiment of the suspension slider assembly.
Figure 12:
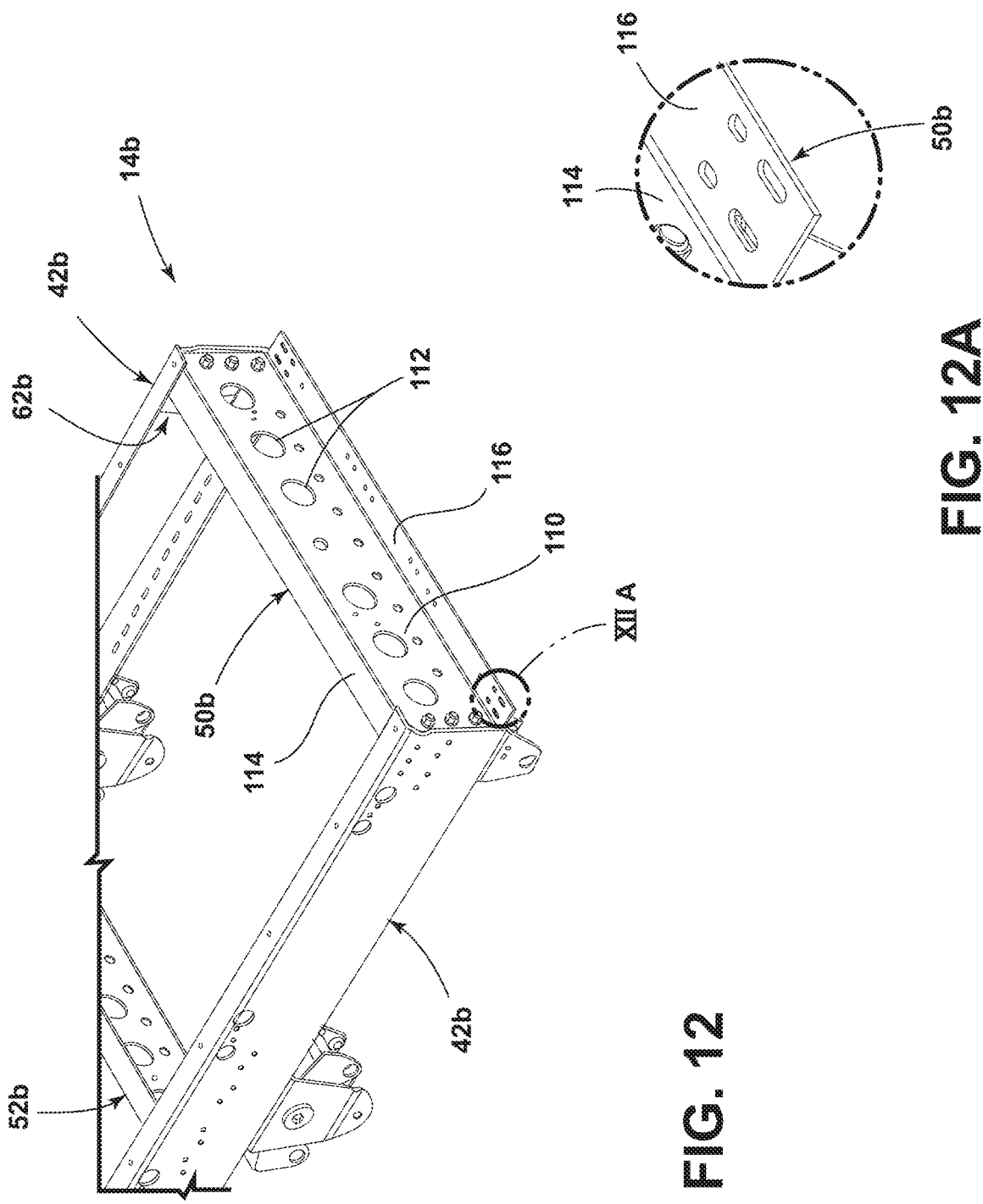
FIG. 12 is a partial perspective view of the suspension slider assembly of FIG. 11.

The suspension slider assembly 14b may further include a pair of front gusset members 60b, a pair of rear gusset members 62b and a pair of center gusset members 64b. As the gusset members 60b, 62b, 64b are similarly configured, the front gusset member 60b (FIGS. 13 and 14) is described herein. In the illustrated example, each front gusset member 60b includes a body portion 118, and a pair of side walls 120 extending orthogonally from the body portion 118. In the illustrated example, the body portion 118 may include a weight reduction aperture 122 extending therethrough. Alternatively, the weight reduction aperture 122 may be configured so as to receive ends of a lateral frame member, similar to the previously described arrangement of the lateral frame members 48, 50, 52 with respect to the gussets 60, 62, 64 of the suspension slider assembly 14, thereby allowing the front gusset members 60b, 62b, 64b to alternatively be used in conjunction with the Z-shaped lateral members 48b, 50b, 52b, or the box-shaped lateral frame members 48, 50, 52. The upper edge of the body portion 118 and one of the side walls 120 may include a cutout 122 that provides space for positioning the upper flange 114 of the front lateral frame member 48b between the front gusset member 60b and the upper flange 44b of the longitudinal frame member 42b. The front gusset member 60b may be fixedly secured to the longitudinal frame member 42b and/or the front lateral frame member 48 by welds 123 extending about the periphery thereof. Alternatively, the front gusset member 60b may be weldably secured to the associated longitudinal frame member 42b, while the front lateral frame member 48b is secured to the front gusset member 60b via a plurality of mechanical fasteners, such as bolts 124 and 126 as best illustrated in FIGS. 11 and 12.

Figure 14A:
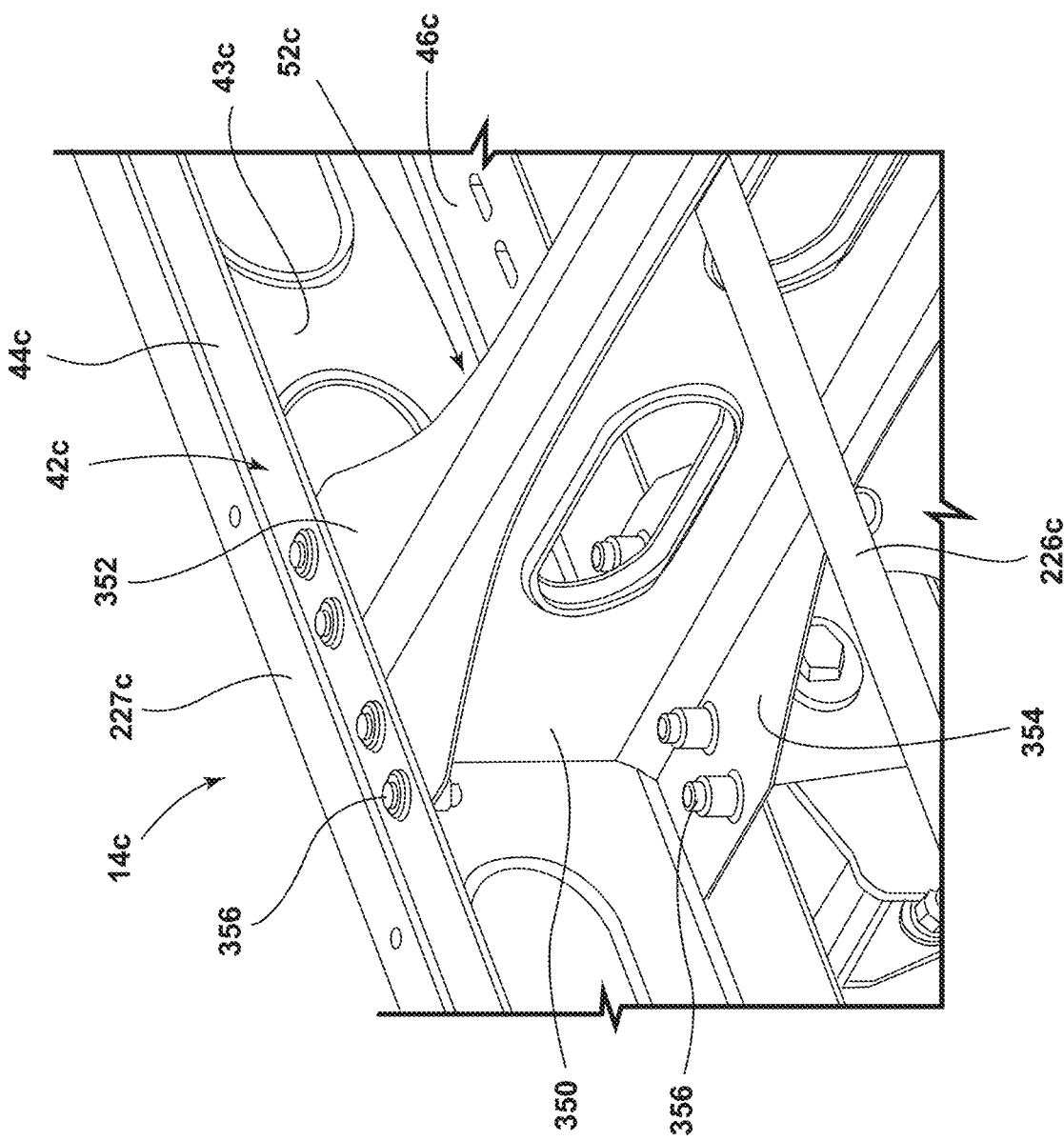
FIG. 14A is a partial perspective view of another alternative embodiment of the suspension slider assembly.

The reference numeral 14c (FIG. 14A) generally designates another embodiment of the suspension slider assembly. Since the suspension slider assembly 14c is similar to the previously described suspension slider assembly 14, similar parts appearing in FIGS. 1-6 and FIG. 14A respectively are represented by the same, corresponding reference numeral, except for the suffix "c" in the numerals of the latter. In the illustrated example, at least one of the lateral frame members has an I-beam shaped cross-sectional configuration, where FIG. 14A shows the center lateral frame member 52c as an example. The center lateral frame member 52c may have a vertical body portion 350, an upper flange 352 extending orthogonally from the vertical body portion 350, and a lower flange 354 extending orthogonally from the vertical body portion 350. The center lateral frame member 52c is releasably secured to the longitudinal frame members 42c via a plurality of mechanical fasteners, and specifically may be secured to the longitudinal frame members 42c by a plurality of bolts 356 that respectively secure the upper and lower flanges 352, 354 of the center lateral frame member 52c to the upper and lower flanges 44c, 46c of the longitudinal frame members 42c. It is noted that this connection arrangement may also be utilized with and incorporated for use with beams with various other configurations, including but not limited to, the box-shaped lateral frame members 48, 50, 52 (FIGS. 1, 3 and 4), the C-shaped lateral frame members 48a, 50a, 52a (FIGS. 7 and 8), and the Z-shaped lateral frame members 48b, 50b, 52b (FIGS. 11 and 12).

Figure 15:
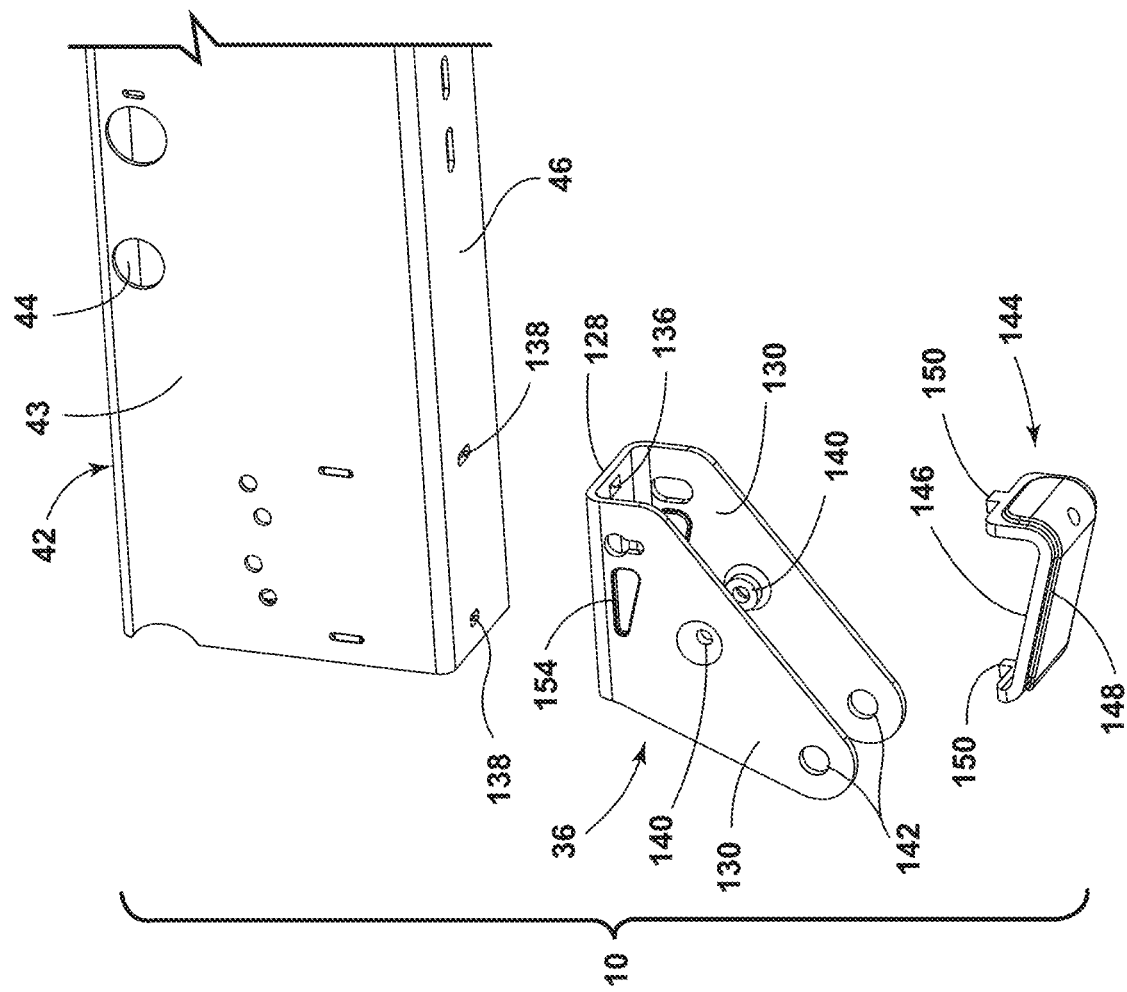
FIG. 15 is an exploded perspective view of the vehicle frame rail, a first hanger bracket, and a wear plate mounting bracket.
Figure 16:
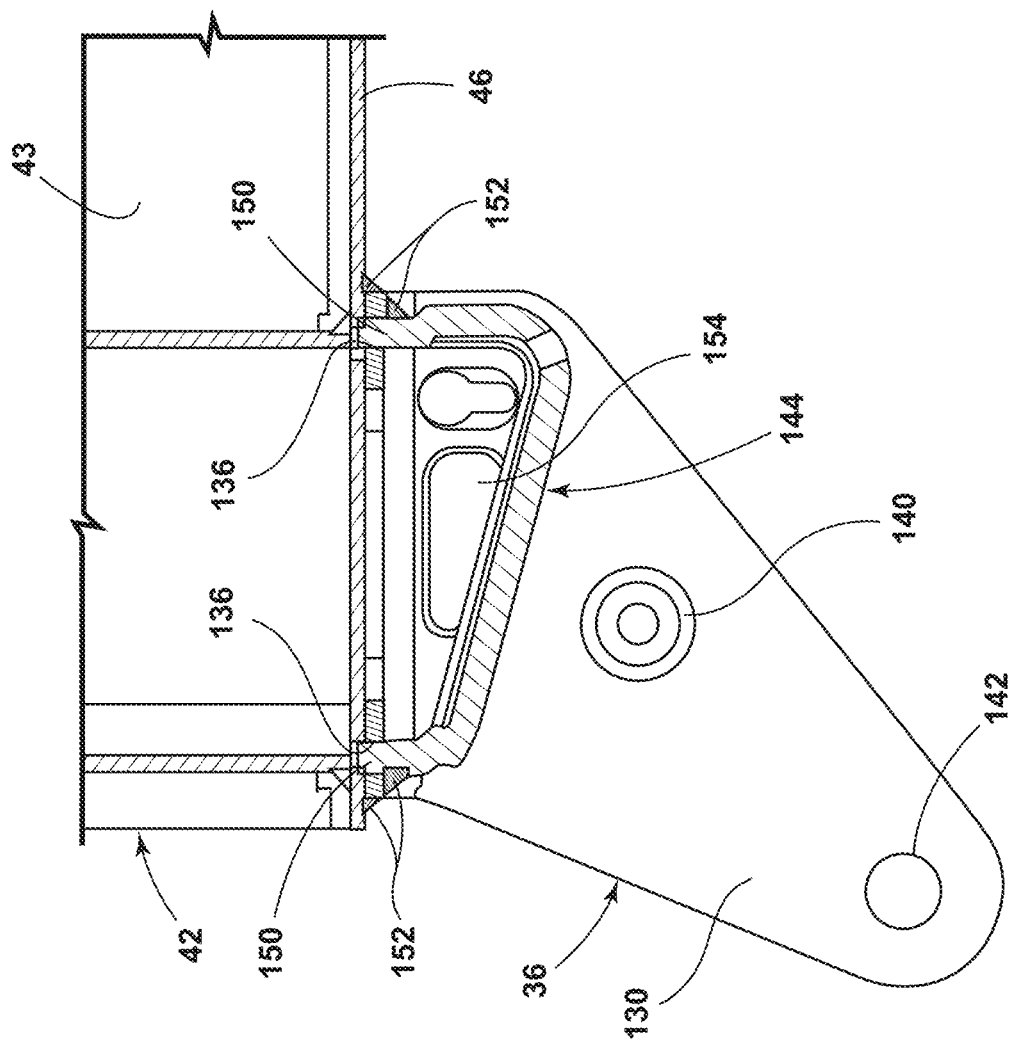
FIG. 16 is a cross-sectional side elevation view taken along the line XVI-XVI, FIG. 1.

As described above, the suspension assembly 24 (FIGS. 1 and 2) includes the front leaf spring assemblies 32, the rear leaf spring assemblies 34, the front hanger brackets 36, the center hanger bracket assemblies 38 and the rear hanger brackets 40. As the front hanger brackets 36 and the rear hanger brackets 40 are similarly constructed, only the front hanger brackets 36 are described herein. As best illustrated in FIGS. 15 and 16, each front hanger bracket 36 has a U-shaped configuration and includes an upper wall 128 and a pair of side walls 130 extending orthogonally downward from the upper wall 128. The top wall includes a pair of alignment apertures configured to align with a corresponding pair of alignment apertures 138 extending through the bottom flange 46 of the longitudinal frame member 42. Each side wall 130 further includes an integrally formed stop member 140, and a pair of apertures 142 located at a distal end thereof and configured to pivotally mount a trailing arm, as described below. A wear pad assembly 144 includes a wear pad mounting bracket 146 and a wear pad 148 secured to an outer surface of the wear pad mounting bracket 146. The wear pad mounting bracket 146 may include a pair of alignment tabs 150 extending therefrom. In assembly, the wear pad assembly 144 is positioned within the associated front hanger bracket 36 such that the alignment tabs 150 align with and extend through the alignment apertures 136 of the front hanger bracket 36. The front hanger bracket 36 and the wear pad assembly 144 are then positioned and aligned with the longitudinal frame member 42 such that the alignment tabs 150 are aligned with and received within the corresponding alignment apertures 138 of the longitudinal frame member 142, thereby properly aligning the front hanger bracket 36 and the wear pad assembly 144 with the longitudinal frame member 42. The wear pad mounting bracket 146 and the front hanger bracket 36 may then be secured to the bottom flange 46 of the longitudinal frame member 42 via welds 152. Alternatively or in addition, the wear pad mounting bracket 146 may be supported via bracket support portions 154 that extend inwardly from the side walls 130 of the front hanger bracket 36.

Figure 17:
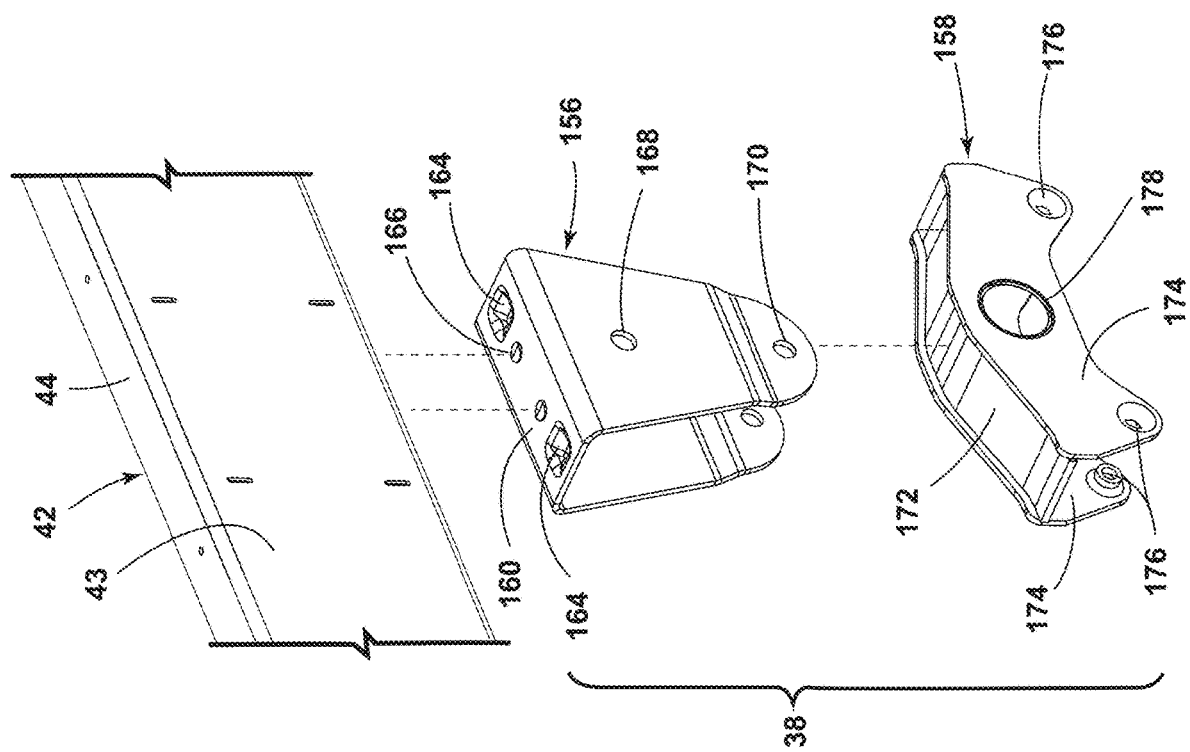
FIG. 17 is an exploded perspective view of the vehicle frame rail, a second hanger bracket, and an equalizing bracket.
Figure 18:
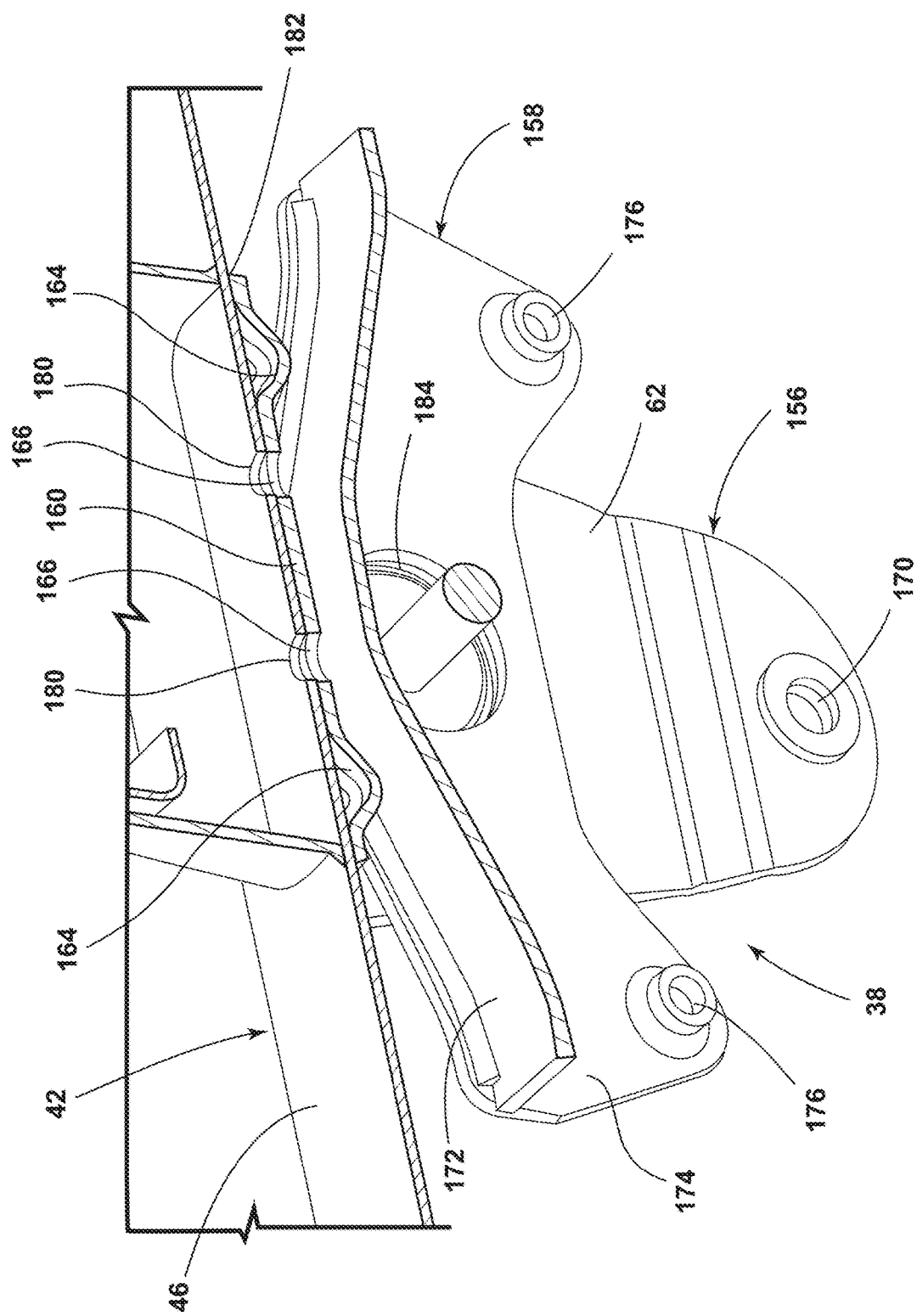
FIG. 18 is a cross-sectional side elevation view taken along the line XVIII-XVIII, FIG. 1.

As best illustrated in FIGS. 17 and 18, each center hanger bracket assembly 38 includes a center hanger bracket 156 fixedly attached to the longitudinal frame member 42 and an equalizer bracket 158 pivotably coupled to the center hanger bracket 156. In the illustrated example, the center hanger bracket 156 has a U-shaped cross-sectional configuration and includes an upper wall 160 and a pair of side walls 162 extending orthogonally downward from the upper wall 160. The upper wall 160 may include a pair of stop members 164 and bosses or extensions 166, as further described below. Each side wall 162 includes an upper aperture 168 for pivotably coupling the equalizer bracket 158 with the center hanger bracket 156 and a lower aperture 170 pivotably coupling the center hanger bracket 156 with a corresponding trailing arm, as described below. The equalizer bracket 158 includes an arcuately-shaped upper wall 172 and a pair of side walls 174 extending orthogonally downward from the upper wall 172 and weldably secured therewith. The side walls 174 may each include a pair of integrally formed stop members 176 and a centrally located pivot aperture 178. In assembly, the alignment bosses or extensions 166 are aligned with and positioned within corresponding alignment apertures 180 of the lower flange 46 of the longitudinal frame member 42, thereby ensuring proper alignment of the center hanger bracket 156 with the longitudinal frame member 42 before the center hanger bracket 156 is fixedly secured to the longitudinal frame member 42 via a weld 182. The equalizer bracket 158 is pivotably secured to the center hanger bracket 156 via a pivot assembly or bushing assembly 184, where the stop members 164 are configured to limit pivoting movement of the equalizer bracket 158 with respect to the center hanger bracket 156 during operation of the vehicle suspension arrangement 10.

Figure 19:
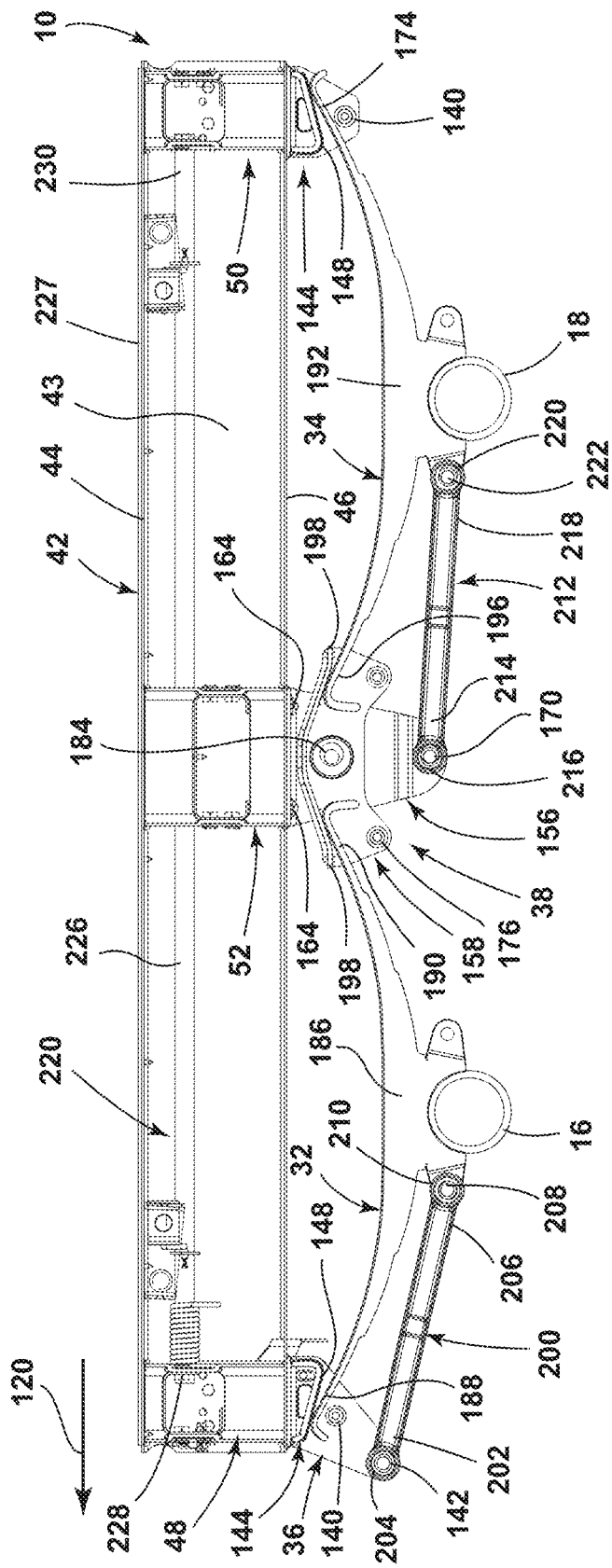
FIG. 19 is a cross-sectional side elevation view taken along the line XIX-XIX, FIG. 1.

As best illustrated in FIG. 19, each front leaf spring assembly 32 includes a center portion 186 secured to the front axle member 16, a first end 188 positioned between the wear pad assembly 144 and the stop member 140 of the front hanger bracket 36, and a second end 190 positioned between the equalizer bracket 158 and a pair of the stop members 176. Similarly, the rear leaf spring assemblies 34 each include a center portion 192 secured to the rear axle member 18, a first end 174 positioned between the wear pad assembly 144 and the stop members 140, and a second end 196 positioned between the equalizer bracket 158 and stop members 176. It is noted that wear pads 198 may be positioned between the top upper wall 160 of the equalizer bracket 158 and the second ends 190, 196 of the front and rear leaf spring assemblies 32, 34. A pair of forward trailing arms 200 extend between the corresponding front hanger bracket 36 and the front axle member 16, with a first end 202 of each forward trailing arm 200 pivotably secured to a corresponding front hanger bracket 36 at the apertures 142 via a pivot or bushing assembly 204, and with a second end 206 of each of the trailing arms 200 pivotably secured to the front axle member 16 at a pivot point 208 via a corresponding pivot or bushing assembly 210. Similarly, a pair of rearward trailing arms 212 pivotably couple the center hanger bracket 156 with the rear axle member 18, with each rearward trailing arm 212 including a first end 214 pivotably coupled to the corresponding center hanger bracket 156 at the lower apertures 170 via a pivot or bushing assembly 216 and a second end 218 of the trailing arm 212 pivotably coupled to the rear axle member 18 via a pivot or bushing assembly 220 for pivoting about a pivot point 222.

In assembly, the suspension slider assembly 14 is slidably coupled to the vehicle frame assembly 12 via a plurality of slider brackets 223 secured to the body portion 43 of the longitudinal frame members 42 and each including a U-shaped section that extends about an outwardly-extending lower flange 224 of the corresponding Z-shaped vehicle frame rail 26, thereby allowing the suspension slider assembly 14 to be slidably repositioned along the length of the vehicle frame assembly 12. A friction reduction member (227) may be located between an upper flange 225 of each of the vehicle frame rails 23 and the corresponding longitudinal frame member 42 of the suspension slider assembly 14.

Figure 7:
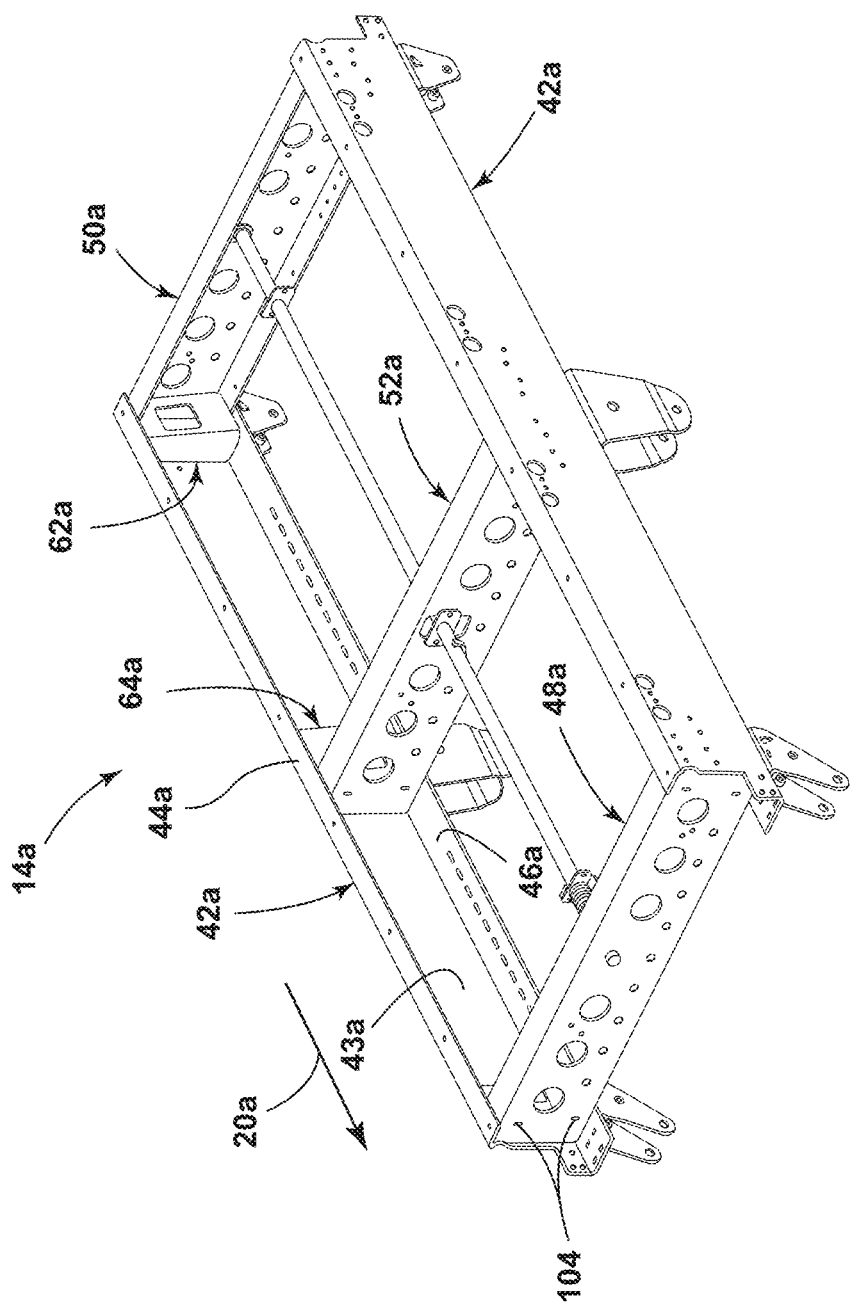
FIG. 7 is a perspective view of an alternative embodiment of the suspension slider assembly.
Figure 20:
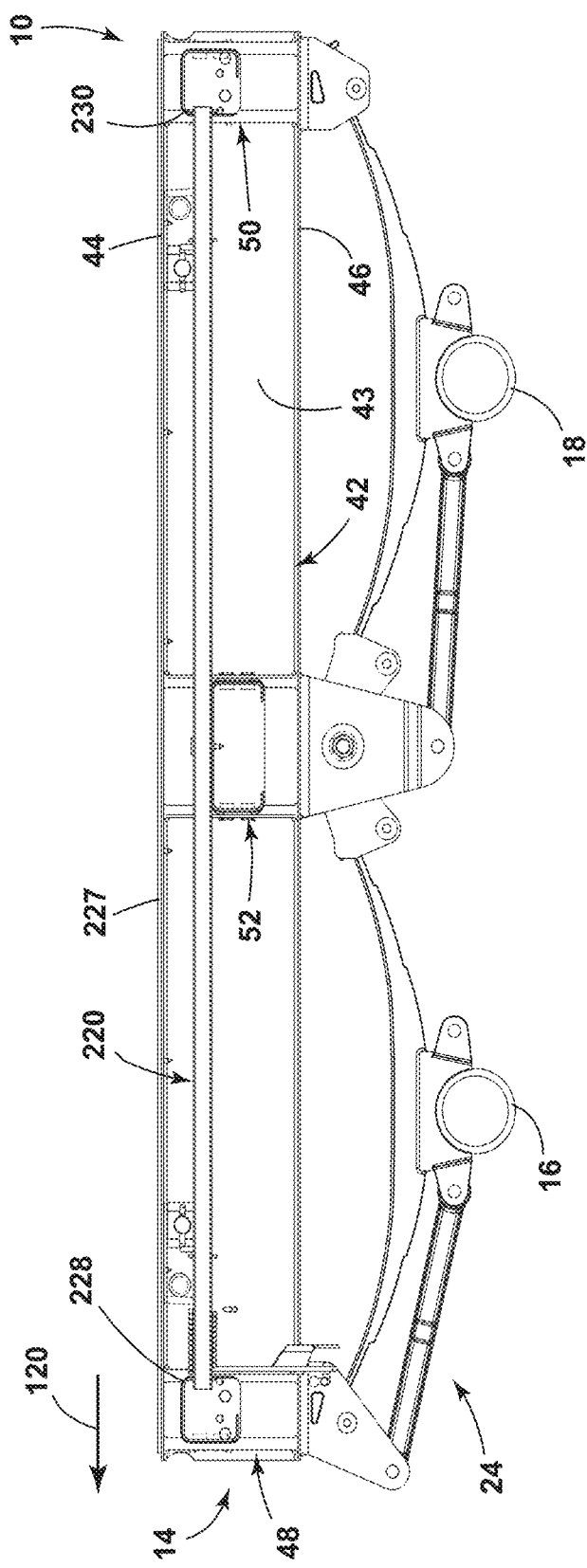
FIG. 20 is a cross-sectional side elevation view taken along the line XX-XX, FIG. 1.
Figure 22:
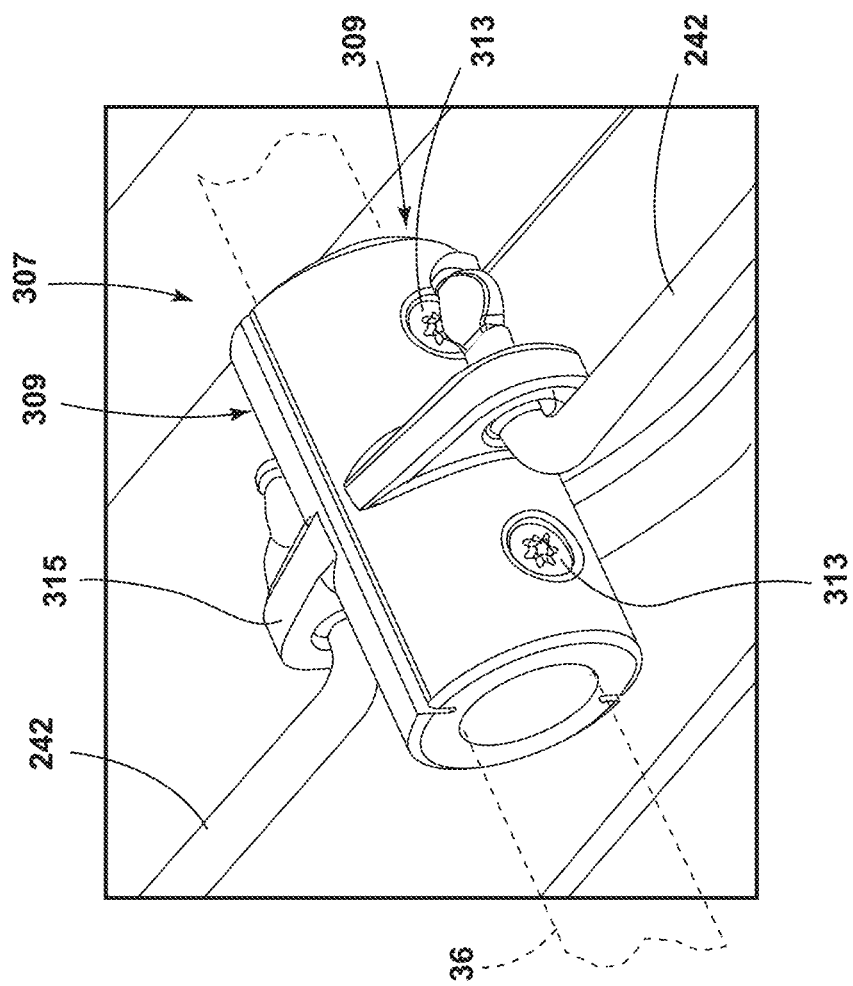
FIG. 22 is a perspective view of an alternative actuator cam arrangement.
Figure 21:
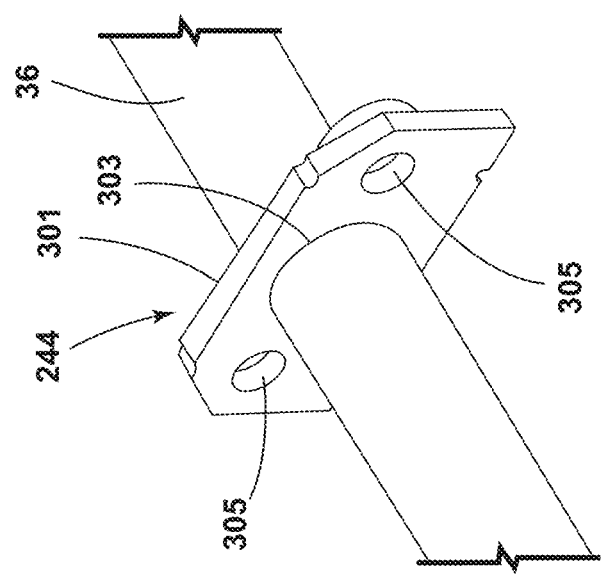
FIG. 21 is a perspective view of an actuator cam.

The vehicle suspension arrangement 10 may further include a locking arrangement 220 (FIGS. 1, 19 and 20) that includes a longitudinally-extending torsional bar 226 having a first end 228 pivotably received within the front lateral frame member 48, and a second end 230 pivotably received within the rear lateral frame member 50. In the illustrated example, a center portion 232 of the torsional bar 226 extends over an upper wall 234 of the center lateral frame member 52 and is secured thereto via a pivot bracket 236. Alternatively, and as best illustrated in FIGS. 7, 8 and 14a, the center lateral frame member, including the center lateral frame members 52, 52a, 52b, may be configured such that the torsional bar 226a, 226c extends through the center lateral frame member 52a, 52c rather than passing over or above it, and that a similar configuration could be utilized with the suspension slider assembly 14b (FIGS. 11 and 12). The torsional bar 226 is coupled to corresponding locking pins 240 via corresponding actuator arms 242 pivotably coupled to the torsional bar 226 via actuator cams 244. As best illustrated in FIG. 21, the actuator cams 244 each include a body portion 301 having an aperture 303 extending therethrough which receives the torsional bar 226, and a pair of actuator arm apertures 305 for receiving ends of the respective actuator arms 242 (FIG. 1), where the body portion is welded to the torsional bar 36. In an alternative embodiment, a bolt-on actuator cam arrangement 307 (FIG. 22) may be provided, where the actuator cam arrangement 307 includes a pair of collar members 309 each having a cylindrical body portion 311 clamped to one another about the torsional bar 226 via a pair of clamping bolts 313, and an arm portion 315 extending outward from the respective body portion 311 and pivotably coupled to an end of a respective actuator arm 242. Each locking pin 240 is slidably received within a locking pin mounting bracket 246 that is fixedly secured to the body portion 43 of the corresponding longitudinal frame member 42 via a weld. It is noted that in the illustrated example, each locking pin mounting bracket 246 includes a pair of apertures for receiving the locking pins 240, including a small diameter aperture 248 and a large diameter aperture 250, where the large diameter aperture 250 has a larger diameter than the small diameter aperture 248. It is noted that this configuration of the locking pin mounting bracket 246 allows a standardized, single assembly to be utilized with locking pins of various diameters, where the particular locking pin may be selected to correspond to the diameter of the locking apertures 28 of the vehicle frame rails 26. In operation, the locking arrangement 220 is operable between a locked configuration, where the locking pins 240 extend through the locking apertures 28 of the vehicle frame rails 26, thereby preventing sliding movement of the suspension slider assembly 14 with respect to the vehicle frame assembly 12, and an unlocked configuration where the locking pins 40 are withdrawn from the locking apertures 28 of the vehicle frame rails 26, thereby allowing the suspension slider assembly 14 to be slidably repositioned along the length of the vehicle frame assembly 12.

The invention claimed is:

1. A vehicle suspension arrangement, comprising:
a suspension slider assembly, comprising:
a first longitudinal frame member configured to be slidably coupled to a first vehicle frame member;
a second longitudinal frame member laterally spaced from the first longitudinal frame member and configured to be slidably coupled to a second vehicle frame member;
a first gusset member fixed to the first longitudinal frame member and including a first aperture;
a second gusset member fixed to the second longitudinal frame member and including a second aperture; and
a first lateral frame member extending between the first and second longitudinal frame members, the first lateral frame member having a first end received within the first aperture and a second end received within the second aperture, wherein first and second ends of the first lateral frame member are respectively attached to the first and second gussets via mechanical fasteners;
an axle member configured to support a pair of wheel assemblies; and
a suspension assembly configured to support the suspension slider assembly from the axle member, the suspension assembly including a spring member positioned between the suspension slider assembly and the axle member.

2. The vehicle suspension arrangement of claim 1, wherein the suspension slider assembly further comprises:
a third gusset member fixed to the first longitudinal frame member and including a third aperture;
a fourth gusset member fixed to the second longitudinal frame member and including a fourth aperture; and
a second lateral frame member extending between the first and second longitudinal frame members and spaced from the first lateral frame member, the second lateral frame member having a first end received within the third aperture and a second end received within the fourth aperture.

3. The vehicle suspension arrangement of claim 1, wherein the mechanical fasteners include bolts.

4. The vehicle suspension arrangement of claim 1, wherein the first lateral frame member has a box-shaped cross section.

5. The vehicle suspension arrangement of claim 1, wherein the first lateral frame member has a downwardly-disposed, longitudinally-extending slot.

6. The vehicle suspension arrangement of claim 1, wherein the first longitudinal frame member includes a first portion of an alignment arrangement, and the first gusset member includes a second portion of the alignment arrangement that cooperates with the first portion to align the first gusset member with the first longitudinal frame member during assembly of the first gusset member with the first longitudinal frame member.

7. The vehicle suspension arrangement of claim 6, wherein the first portion includes one of a tab and a slot configured to receive the tab, and wherein the second portion includes the other of the tab and the slot.

8. The vehicle suspension arrangement of claim 1, further comprising:
a locking arrangement operable between a locked configuration wherein the locking arrangement is configured to lock the suspension slider assembly at a position along a length of the first vehicle frame member, and an unlocked configuration wherein the suspension slider assembly may be moved along the length of the first vehicle frame member.

9. The vehicle suspension arrangement of claim 1, wherein the first aperture entirely encircles the first end of the lateral frame member and the second aperture entirely encircles the second end of the lateral frame member.

10. A vehicle suspension arrangement, comprising:
a suspension slider assembly configured to be slidably coupled to a vehicle frame assembly;
an axle member configured to support a pair of wheel assemblies; and
a suspension assembly configured to support the suspension slider assembly from the axle member, the suspension assembly comprising:
a leaf spring having a first end and a second end;
a first hanger bracket pivotably coupling the first end of the leaf spring to the suspension slider assembly, wherein the first hanger bracket is directly coupled to the suspension slider assembly via a first mechanical fastener;
a second hanger bracket pivotably coupling the second end of the leaf spring to the suspension slider assembly, wherein the second hanger bracket is directly coupled to the suspension slider assembly via a second mechanical fastener; and
a trailing arm having a first end pivotably coupled to the first hanger bracket, and a second end operably coupled to the axle member.

11. The vehicle suspension arrangement of claim 10, wherein the first and second mechanical fasters each comprise a bolt.

12. The vehicle suspension arrangement of claim 10, wherein the first hanger bracket has a U-shaped configuration.

13. The vehicle suspension arrangement of claim 10, wherein the second hanger bracket has a U-shaped configuration.

14. The vehicle suspension arrangement of claim 10, wherein the first hanger bracket includes a first portion of a first alignment arrangement, and the suspension slider assembly includes a second portion of the first alignment arrangement that aligns with the first portion to align the first hanger bracket with the suspension slider assembly during assembly.

15. The vehicle suspension arrangement of claim 10, wherein the first hanger bracket is aligned with the suspension slider assembly via a tab and a slot configured to receive the tab.

16. The vehicle suspension arrangement of claim 14, wherein the first and second portions of the first alignment arrangement each include a slot configured to receive an alignment member therethrough.

17. The vehicle suspension arrangement of claim 16, further comprising:
 a wear pad mounting bracket that includes the alignment member.

18. A vehicle suspension arrangement, comprising:
 a suspension slider assembly configured to be slidably coupled to a vehicle frame assembly;
 an axle member configured to support a pair of wheel assemblies; and
 a suspension assembly configured to support the suspension slider assembly from the axle member, the suspension assembly comprising:
 a first leaf spring having a first end and a second end;
 a second leaf spring having a first end and a second end;
 a first hanger bracket operably coupled to the suspension slider assembly and pivotably coupling the first end of the first leaf spring to the suspension slider assembly;
 a second hanger bracket operably coupled to the suspension slider assembly and pivotably coupling the first end of the second leaf spring to the suspension slider assembly; and
 a center hanger bracket assembly that includes a third hanger bracket operably coupled to the suspension slider assembly, and an equalizing bracket pivotably coupled to the third hanger bracket, and at least one wear pad positioned between the equalizing bracket and the second end of the leaf spring, where the equalizing bracket is coupled to the second end of the first leaf spring and the second end of the second leaf spring such that the second end of the first leaf spring and the second end of the second leaf spring are each configured to engage the at least one leaf spring.

19. The vehicle suspension arrangement of claim 18, wherein the equalizing bracket includes a first stop member configured to limit movement of the first leaf spring with respect to the equalizing bracket.

20. The vehicle suspension arrangement of claim 19, wherein the first stop member is integrally formed with a side wall of the equalizing bracket.

21. The vehicle suspension arrangement of claim 19, wherein the equalizing bracket includes a second stop member configured to limit movement of the second leaf spring with respect to the equalizing bracket.

* * * * *

UNITED STATES PATENT AND TRADEMARK OFFICE
CERTIFICATE OF CORRECTION

PATENT NO. : 11,970,210 B2
APPLICATION NO. : 17/814633
DATED : April 30, 2024
INVENTOR(S) : Galazin et al.

It is certified that error appears in the above-identified patent and that said Letters Patent is hereby corrected as shown below:

In the Specification

Column 4, Line 23:
"members" should be — member —

Column 4, Line 33:
Delete "an"

Column 4, Line 65:
"allow" should be — allows —

In the Claims

Column 11, Claim 11, Line 2:
"fasters" should be — fasteners —

Column 12, Claim 18, Lines 13, 15, 17:
"equalizing" should be — equalizer —

Column 12, Claim 19, Lines 24, 26:
"equalizing" should be — equalizer —

Column 12, Claim 20, Line 29:
"equalizing" should be — equalizer —

Column 12, Claim 21, Lines 31, 33:
"equalizing" should be — equalizer —

Signed and Sealed this
Fifth Day of November, 2024

Katherine Kelly Vidal
*Director of the United States Patent and Trademark Office*